US011097986B2

(12) United States Patent
Schmidt

(10) Patent No.: US 11,097,986 B2
(45) Date of Patent: Aug. 24, 2021

(54) PRECERAMIC IONIC SYSTEMS

(71) Applicant: United Technologies Corporation, Farmington, CT (US)

(72) Inventor: Wayde R. Schmidt, Pomfret Center, CT (US)

(73) Assignee: Raytheon Technologies Corporation, Farmington, CT (US)

(*) Notice: Subject to any disclaimer, the term of this patent is extended or adjusted under 35 U.S.C. 154(b) by 86 days.

(21) Appl. No.: 16/173,436

(22) Filed: Oct. 29, 2018

(65) Prior Publication Data
US 2019/0062220 A1 Feb. 28, 2019

Related U.S. Application Data

(63) Continuation-in-part of application No. 14/725,208, filed on May 29, 2015, now abandoned.

(51) Int. Cl.
C04B 35/571 (2006.01)
C08G 77/26 (2006.01)
C08G 77/50 (2006.01)
F01D 5/28 (2006.01)
C04B 35/80 (2006.01)
C04B 35/56 (2006.01)

(52) U.S. Cl.
CPC .......... C04B 35/571 (2013.01); C04B 35/806 (2013.01); C08G 77/26 (2013.01); C08G 77/50 (2013.01); F01D 5/282 (2013.01); F01D 5/284 (2013.01); C04B 35/5611 (2013.01); C04B 2235/3843 (2013.01); C04B 2235/483 (2013.01); C04B 2235/80 (2013.01); F05D 2300/437 (2013.01); F05D 2300/6033 (2013.01)

(58) Field of Classification Search
CPC ... B82Y 30/00; C01B 32/907; C01B 21/0828; C04B 35/589; C04B 35/6269; C08L 83/16; G03F 7/0002
See application file for complete search history.

(56) References Cited

U.S. PATENT DOCUMENTS 4,861,844 A 8/1989 Lebrun et al.
4,910,173 A 3/1990 Niebylski
(Continued)

FOREIGN PATENT DOCUMENTS

CN 104211967 A 12/2014
EP 0915067 A2 5/1999
(Continued)

OTHER PUBLICATIONS

Extended EP Search Report dated Apr. 3, 2020 issued for corresponding European Patent Application No. 19206043.2.
(Continued)

Primary Examiner — Noah S Wiese
(74) Attorney, Agent, or Firm — Bachman & LaPointe, P.C.

(57) ABSTRACT

A process of forming a Si-containing ceramic comprises forming a Si-based polymeric composition. The process includes neutralizing a charge of said Si-based polymeric composition. The process includes adding thermal energy under a controlled atmosphere to the Si-based polymeric composition. A turbine engine component comprises an airfoil and the airfoil comprises a Ceramic Matrix Composite (CMC) material.

6 Claims, 3 Drawing Sheets

(56) References Cited

U.S. PATENT DOCUMENTS

| | | | |
|---|---|---|---|
| 5,990,024 A | 11/1999 | Blum et al. | |
| 7,087,656 B2 * | 8/2006 | Garcia | C08L 53/005 521/63 |
| 7,749,425 B2 | 7/2010 | Malenfant et al. | |
| 7,883,828 B2 | 2/2011 | Allen et al. | |
| RE44,683 E | 12/2013 | Shen | |
| 2005/0036931 A1 | 2/2005 | Garcia et al. | |
| 2005/0159293 A1 | 7/2005 | Wan et al. | |
| 2005/0170192 A1 | 8/2005 | Kambe et al. | |
| 2005/0255631 A1 | 11/2005 | Bureau et al. | |
| 2007/0142203 A1 | 6/2007 | Malenfant et al. | |
| 2016/0039720 A1 | 2/2016 | Schmidt | |
| 2016/0244372 A1 | 8/2016 | Schmidt et al. | |
| 2016/0347670 A1 | 12/2016 | Schmidt | |

FOREIGN PATENT DOCUMENTS

| | | |
|---|---|---|
| EP | 1801071 A2 | 6/2007 |
| EP | 3061604 A2 | 8/2016 |

OTHER PUBLICATIONS

Partial EP Search Report dated Mar. 3, 2020 issued for corresponding European Patent Application No. 19206043.2.

Akkas H D et al: "Silicon oxycarbide-based composites produced from pyrolysis of polysiloxanes with active Ti filler", Journal of the European Ceramic Society, vol. 26, No. 15, 2006, pp. 3441-3449, ISSN: 0955-2219, DOI: 10.1016/J.JEURCERAMSOC.2005.08.017.

Emanuel Ionescu et al: "Polymer-Derived Ceramics (PDCs): Materials Design Toward Applications at Ultrahigh-Temperatures and in Extreme Environments" in: "MAX Phases and Ultra-High Temperature Ceramics for Extreme Environments": 2013, pp. 203-245m DOI: 10.4018/978-1-4666-4056-5.ch0071.

European Office Action dated Feb. 20, 2019 issued for corresponding European Patent Application No. 16171687.3.

* cited by examiner

| Chemical class | Group | Formula | Structural Formula | Prefix | Suffix | Example |
|---|---|---|---|---|---|---|
| Alcohol | Hydroxyl | ROH | R—O—H | hydroxy- | -ol | Methanol |
| Ketone | Carbonyl | RCOR' | R¹—C(=O)—R² | keto-, oxo- | -one | Methyl ethyl ketone (Butanone) |
| Aldehyde | Aldehyde | RCHO | R—C(=O)—H | aldo- | -al | Acealdehyde (Ethanal) |
| Carboxylic acid | Carboxyl | RCOOH | R—C(=O)—OH | carboxy- | -oic acid | Acetic acid (Ethanoic acid) |
| Ether | Ether | ROR' | R—O—R' | alkoxy- | alkyl alkyl ether | Diethyl ether (Ethanoic acid) |
| Ester | Ester | RCOOR' | R—C(=O)—OR' | | alkyl alkanoate | Ethyl butyrate (Ethyl butanoate) |
| Amide | Carboxamide | RCOHR$_2$ | R—C(=O)—N(R")(R') | carboxamido- | -amide | Acetamide (Ethanamide) |
| Amines | Primary amine | RNH$_2$ | R—N(H)—H | amino- | -amine | Methylamine (Methanamine) |

FIG. 2

PRECERAMIC IONIC SYSTEMS

CROSS-REFERENCE TO RELATED APPLICATIONS

The present disclosure is a Continuation-In-Part of U.S. patent application Ser. No. 14/725,208, filed May 29, 2015.

BACKGROUND

The present disclosure is directed to the creation and use of ionic derivatives of preceramic monomers and polymers.

Silicon carbide (SiC) is a ceramic material with a variety of applications. Silicon carbide exhibits high resistance to oxidation and corrosion, has low density, high strength, and high thermal stability. These characteristics make SiC a suitable material for potentially replacing metal in turbine engine parts. Silicon carbide is also suitable for use in low friction bearings, thermal and environmental barrier coatings, high temperature ceramic composites and wear resistant components.

The hardness and non-melting characteristics of silicon carbide-based ceramic material makes it difficult to process by conventional methods.

An ionic liquid (IL) is a salt in the liquid state. In some contexts, the term has been restricted to salts whose melting point is below some arbitrary temperature, such as 100° C. (212° F.). While ordinary liquids such as water and gasoline are predominantly made of electrically neutral molecules, ionic liquids are largely made of ions and short-lived ion pairs. These substances are variously called liquid electrolytes, ionic melts, ionic fluids, fused salts, liquid salts, or ionic glasses.

Ionic liquids have many applications, such as powerful solvents and electrically conducting fluids (electrolytes). Salts that are liquid at near-ambient temperature are important for electric battery applications, and have been used as sealants due to their very low vapor pressure.

Less well known are Poly(ionic liquid)s, also named polymerized/polymeric ionic liquids (PILs) and PILS are taking an enabling role in some fields of polymer science and material chemistry.

Poly(ionic liquid)s, or polymerized/polymeric ionic liquids (PILs) are commonly prepared via polymerization of ionic liquid monomers. PILs combine some characteristics of ionic liquids with the general property profile of macromolecular architectures, and have found huge potential in energy-/environment-/catalysis-oriented applications, such as polymeric ion conductors, "smart" dispersants and stabilizers, powerful absorbents for solvent purification and CO2 utilization, shaped carbon nanomaterial production, etc.

What is needed is a new process of producing advanced silicon carbide-based ceramic materials.

SUMMARY

In accordance with the present disclosure, there is provided a process of forming a Si-containing ceramic that comprises forming a Si-based polymeric composition. The process includes neutralizing a charge of said Si-based polymeric composition. The process includes adding thermal energy under a controlled atmosphere to the Si-based polymeric composition.

In another and alternative embodiment, the Si-based polymeric composition contains an N atom.

In another and alternative embodiment, the composition is selected from the group consisting of silazanes, amines, amides, and imide-substituted silanes and carbosilanes.

In another and alternative embodiment, neutralizing a charge includes addition of counterions.

In another and alternative embodiment, the method further comprises introducing an additional metal species to the Si-based polymeric composition and forming a composite structure.

In another and alternative embodiment, the Si-based polymeric composition is selected from the group consisting of polymeric polysilanes, polysilazanes, polysiloxanes, polycarbosiloxanes and polycarbosilanes.

In another and alternative embodiment, the polymeric composition can comprise at least one of a mono-functional polymer, bi-functional-polymer, multi-functional-polymer, and hyperbranched polymer, polymer brushes and dendrimer molecules.

In accordance with the present disclosure, there is provided a turbine engine component comprising an airfoil and the airfoil comprises a Ceramic Matrix Composite (CMC) material.

In another and alternative embodiment, the Ceramic Matrix Composite material is a composite having a Si-based polymeric composition.

In another and alternative embodiment, the component further comprises an additional metal species combined with the Si-based polymeric composition.

In another and alternative embodiment, the turbine engine component is a vane or a blade.

In accordance with the present disclosure, there is provided a process for manufacturing a composite system comprising forming a Si-based polymeric composition; functionalizing the Si-based polymeric composition with an ionizable side group; and adding thermal energy to the Si-based polymeric composition and ionizable side group.

In another and alternative embodiment, the Si-based polymeric composition is selected from the group consisting of polymeric polysilanes, polysilazanes, polysiloxanes, polycarbosiloxanes and polycarbosilanes.

In another and alternative embodiment, the polymeric composition can comprise at least one of a mono-polymer, bi-polymer, multi-functional-polymer, and hyperbranched polymer, polymer brushes and dendrimer molecules.

In another and alternative embodiment, the ionizable side group comprises hydrogel components.

In another and alternative embodiment, the hydrogel components comprise at least one of polyethylene glycol, polyethylenoxide, polyacrylamine, polyacrylic acid, and polymethacrylic acid.

In another and alternative embodiment, the method further comprises incorporating an organic functional group onto a backbone of the Si-based polymeric composition.

In another and alternative embodiment, the organic function group is selected from the group consisting of hydroxyl, carbonyl, aldehyde, carboxyl, ether, ester, carboxamide and amine.

Other details of the system are set forth in the following detailed description and the accompanying drawing wherein like reference numerals depict like elements.

BRIEF DESCRIPTION OF THE DRAWINGS

FIG. 2 is a table of exemplary organic functional groups

DETAILED DESCRIPTION

Figure 1:
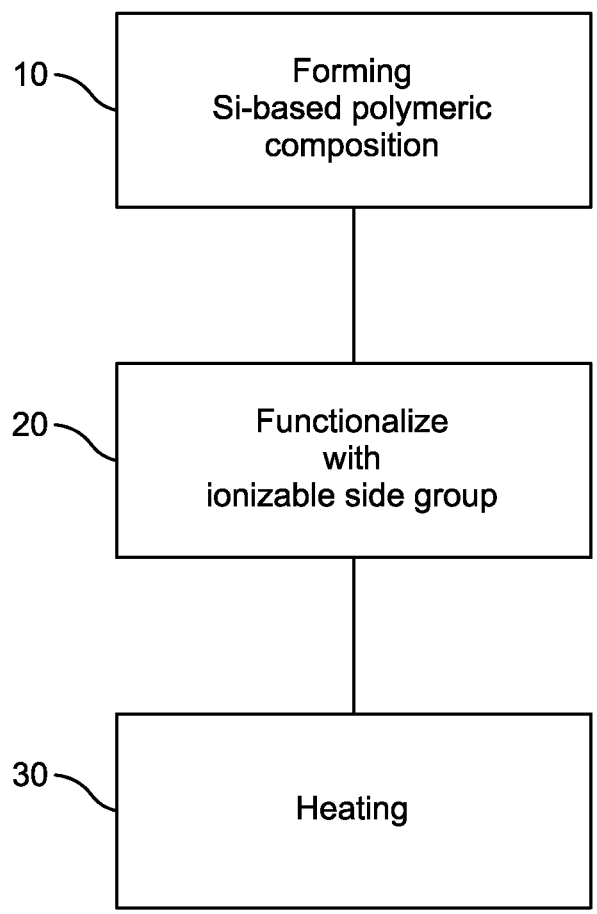
FIG. 1 is an exemplary process diagram.

Referring now to the FIG. 1, a process diagram illustrates a method to create Si-based polymeric systems. The process includes forming a Si-based polymeric composition 10. The Si-based polymeric composition is then functionalized with an ionizable side group 20. The Si-based polymeric composition and ionizable side group are then heated or otherwise exposed to thermal energy, to prepare the appropriate form and composition 30. These functionalized polymers can be heated using conventional thermal heating or microwave radiation-based heating to temperatures ranging from 100 C to 1200 C for times ranging from minutes to hours.

The Si-based polymeric composition is selected from the group consisting of polymeric polysilanes, polysilazanes, polysiloxanes, polycarbosiloxanes and polycarbosilanes, and the like. In one non-limiting example, the Si-based polymer is a polysiloxane with an imidazolium side group. In another non-limiting example, the Si-based polymer is a polycarbosilane with a glycol-based side group.

The polymeric composition can comprise at least one of a mono-functional-polymer, bi-functional-polymer, multi-functional-polymer, dendronized polymer, hyper-branched polymer and polymer brushes. Dendrimer molecules are also included as suitable compositions.

The side group on the Si-based polymer is a specific chemical structure and is selected to comprise a covalent chemical bond between the side group and the polymer or dendrimer backbone, and may be considered to have replaced at least one hydrogen atom on any of the Si, C, N, O, or P atoms within the respective polymer chain or chains. The side group may also be described interchangeably as a chemical functional group. Si-based polymer compositions may be chemically modified to include one or more identical or different side group structures.

Chemically distinct formulations are also contemplated. In one example, the Si-based polymer contains heteroatoms (C, N, O, P, etc.) within the polymer backbone (i.e. Si—C—Si bonding as in a polycarbosilane or Si—O—Si bonding as in a polysiloxane). In an alternate example, the heteroatom is part of the side group that is chemically bonded to the primary Si-containing polymer chains.

The ionizable side group comprises hydrogel components. The hydrogel components can be monomeric or polymeric in nature and include polyethylene glycol, polyethylenoxide, polyacrylamine, polyacrylic acid, polymethacrylic acid, and the like.

In an alternative embodiment, the process can include incorporating an organic functional group onto a backbone of the Si-based polymeric composition. The organic functional group can include any of hydroxyl, carbonyl, aldehyde, carboxyl, ether, ester, carboxamide and amine as shown in FIG. 2. These organic functional groups can be at least partially ionized. Other ionizable functional groups not included in FIG. 2 are also contemplated.

An alternative process of forming a Si-containing ceramic can comprise forming a Si-based polymeric composition. The process includes neutralizing a charge of the Si-based polymeric composition. Neutralizing the charge can include the addition of counterions to the Si-based polymeric composition, including use of monomeric or polymeric species containing opposite charge to that of the Si-based polymeric composition. The process includes adding thermal energy under a controlled atmosphere to the Si-based polymeric composition.

The Si-based polymeric composition can contain an N atom. The compositions that include an N atom as part of the side group structure on the polymer backbone can include silazanes, amines, amides, and imid-substituted silanes and carbosilanes. Given the ionizable character of the N atom, the silicon compounds containing the N atom can be designed as suitable ionic species. The addition of appropriate counterions can provide charge neutrality. Under a predefined heating process with a controlled atmosphere, the silicon containing ionic pair can produce Si-containing ceramic. Depending on the nature of the counter ion, an additional metal species can be introduced to create a composite structure.

An exemplary embodiment can include a polycarbosilane—as would be used to make SiC monolithic ceramics, SiC-containing coatings or SiC/SiC ceramic matrix composites or their constituents that is functionalized with groups that can be ionized, such as a hydroxyl group. Under the right conditions, this would be a negatively charged species which can be blended with a positively charged metal-containing species such as Ti+ to form a charge-pair system. Other appropriate functional groups can be used and the metal species of choice can be tailored. As one example, the preceramic polymer/metal salt species could be created at low temperature and thermally processed to produce a SiC/TiC high temperature composite system. Ionic monomers can be used as well, so that a charged pair can be formed prior to polymerization of the monomer species.

In another alternative embodiment, the Si-based polymeric ionic system can be solid or non-volatile liquids. These forms of systems can be applicable as high-temperature lubricants or heat transfer fluids. In other exemplary systems the ionic systems can be utilized as electrolytes for battery or fuel cell applications.

In another exemplary system the Si-based polymeric ionic pairs can be used as starting materials for coatings, fibers and powders. In other examples these materials can be utilized prior to or after thermal conversion to ceramic material(s).

The ceramic materials that result can be formed into components for gas turbine engines, like airfoils, such as blades and vanes.

Figure 3:
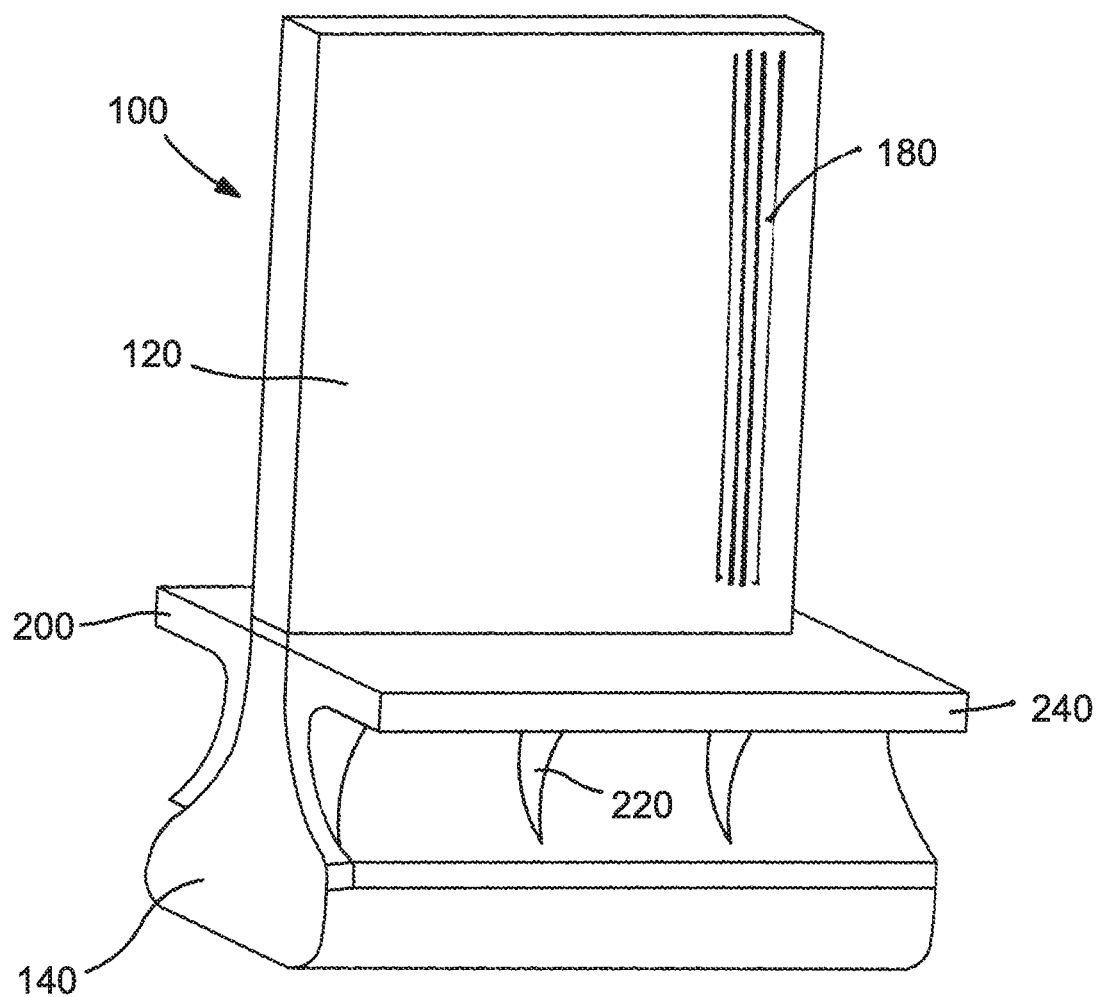
FIG. 3 is a schematic representation of a component which can be used in a gas turbine engine.

Referring now to FIG. 3, there is shown a ceramic matrix composite blade 100 for use in a gas turbine engine (not shown). The blade 100 may be a turbine blade or vane used in the hot section of the engine.

The blade 100 has an airfoil portion 120 and a root portion 140. The airfoil portion 120 and the root portion 140 may be an integral structure formed from a plurality of plies 180 of a ceramic matrix composite material. The blade 100 also has a platform 200 and one or more optional buttresses 220 formed from a platform assembly structure 240. The platform assembly structure 240 is formed from a ceramic matrix composite material. More details of forming the blade 100 can be found in pending patent application Ser. No. 13/173,308 incorporated by reference herein.

The use of ionic derivatives of preceramic materials is emerging and offers a new class of materials with a range of high temperature applications.

Ionic derivatives of preceramic materials can be utilized in many applications including a) high temperature structural composite materials and protective coatings, b) power electronic systems, c) high temperature coolants or heat transfer materials, d) high temperature lubricants with near zero volatility, e) water or polar solvent-dispersible resins for CMC processing.

There has been provided a method to create Si-based polymeric systems. While the creation and use of ionic derivatives of preceramic monomers and polymers has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process of forming a Si-containing ceramic comprising:
   forming a Si-based polymeric composition;
   neutralizing a charge of said Si-based polymeric composition by the addition of counterions to said Si-based polymeric composition including use of monomeric or polymeric species containing an opposite charge to that of the Si-based polymeric composition; and
   adding thermal energy under a controlled atmosphere to said Si-based polymeric composition.

2. The process according to claim 1, wherein said Si-based polymeric composition contains an N atom.

3. The process according to claim 2, wherein said composition is selected from the group consisting of silazanes, amines, amides, and imide-substituted silanes and carbosilanes.

4. The process according to claim 1, further comprising;
   introducing an additional metal species to said Si-based polymeric composition; and
   forming a composite structure.

5. The process according to claim 1, wherein said Si-based polymeric composition is selected from the group consisting of polymeric polysilanes, polysilazanes, polysiloxanes, polycarbosiloxanes and polycarbosilanes.

6. The process according to claim 1, wherein said polymeric composition can comprise at least one of a monofunctional polymer, bi-functional-polymer, multi-functional-polymer, hyperbranched polymer, polymer brushes and dendrimer molecules.

* * * * *